United States Patent [19]

Schlienger et al.

[11] 4,399,344
[45] Aug. 16, 1983

[54] METHOD OF OPERATING HIGH SPEED ELECTRIC ARC SAW

[75] Inventors: Max P. Schlienger, Ukiah; Whalun Szeto, Novato, both of Calif.

[73] Assignee: Retech, Inc., Ukiah, Calif.

[21] Appl. No.: 276,322

[22] Filed: Jun. 22, 1981

Related U.S. Application Data

[63] Continuation-in-part of Ser. No. 793,991, May 5, 1977.

[51] Int. Cl.³ .............................................. B23P 1/00
[52] U.S. Cl. ................................... 219/68; 219/69 M; 219/69 V
[58] Field of Search ................... 219/68, 69 R, 69 M, 219/69 V; 83/39, 42, 49, 863, 864, 875, 877, 880, 882, 886

[56] References Cited

U.S. PATENT DOCUMENTS

Re. 20,035 7/1936 Strobel ............................. 219/69 V
4,215,613 8/1980 Anderson et al. ..................... 83/864

FOREIGN PATENT DOCUMENTS 1220607 5/1960 France .................................. 219/68

Primary Examiner—C. C. Shaw
Attorney, Agent, or Firm—Townsend & Townsend

[57] ABSTRACT

An electric arc saw and a method for operating the saw for cutting metallic objects by melting a narrow kerf into the object are disclosed. The method provides for determining the minimum cutting current. The blade is advanced through the object at a speed which is continuously monitored and varied as required to maintain the current flow between the blade and the object substantially constant. The blade is mounted to a vertically disposed, hollow piston that reciprocates in a cylinder mounted to and movable along a cross-head. The piston can be pivoted abouts its axis to align the blade with the different cutting directions. When the object is so large that the threshold cutting current exceeds the available power supply, or when the power supply exceeds the threshold by a small amount only, the blade is operated to cut through the object in multiple passes, each at a depth which is less than the thickness of the object and chosen to provide a high cutting speed.

14 Claims, 5 Drawing Figures

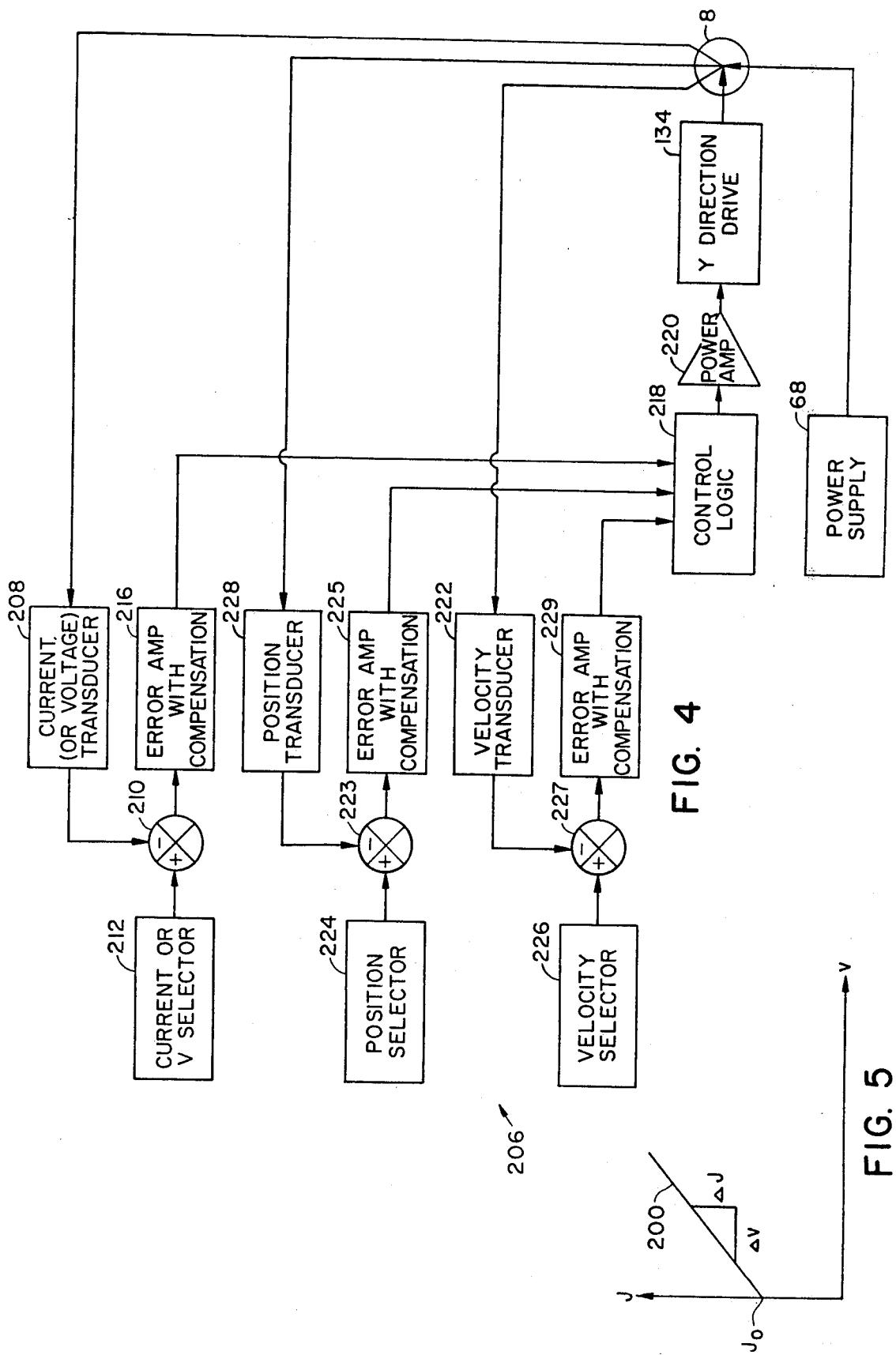

METHOD OF OPERATING HIGH SPEED ELECTRIC ARC SAW

This is a continuation-in-part of pending prior application Ser. No. 793,991 filed on May 5, 1977, of Max P. Schienger and Whalun Szeto for HIGH SPEED ELECTRIC ARC SAW AND METHOD OF OPERATING SAME.

BACKGROUND OF THE INVENTION

The sawing of large metal objects or workpieces such as ingots, heavy plates and the like must be routinely and frequently performed in large scale industrial operations. Although the operation normally requires no more than the slitting of the workpiece, the actual cutting task is laborious, slow and time-consuming, and consumes cutting tools, normally saw blades, at a rapid rate. Consequently, the task is relatively expensive.

In the past, best cutting performance was obtained with abrasive saws. Such saws employ abrasive, e.g., hard faced, diamond-studded, etc., saw blades or discs which are advanced into the workpiece to cut a kerf therein. With increasing workpiece size, and they can have cross-sectional dimensions of up to 65 cm. and more, the construction of the saw blade and of the actual saw becomes more and more complicated and expensive. Yet, maximum cutting rates for such saws presently do not exceed about 775 $cm^2$/min. of the workpiece cross-section when it is constructed of steel and about 2 to $2\frac{1}{2}$ times that rate when it is constructed of an aluminous material. At such cutting rates, the abrasive discs are subjected to extreme stresses, are rapidly worn down and represent a constant danger to persons and property in the vicinity of the saw because of possible blade ruptures caused by the high rpm at which such blades must be operated.

It is also known to flame-cut oxidizable materials, primarily steel, with acetylene-oxygen burners. This process is very slow, wastes a great deal of metal, and is not suitable for making deep cuts because there is no good control over the location and orientation of the cutting flame. Because of the stated drawbacks of this system it is usually limited for cutting plate, bars and the like which have a thickness no more and preferably less than about 10 cm.

It has also been proposed to employ so-called arc saws to cut metallic workpieces. According to this approach, a cut is formed by electrically melting a kerf into the workpiece, normally by providing a rotating blade and applying an electric potential between the blade and the workpiece. The blade is then moved towards the workpiece until it makes contact to initiate an electric current flow. The current flow melts the material which is removed from the kerf by the rotating blade.

Although this last mentioned approach appears promising on its face, it has not found acceptance; in fact, it is doubtful that is has ever been employed in a commercial application. The apparent failure of the electric arc sawing probably results from the fact that arc sawing as such has never been understood. A review of the relevant prior art indicates an overall concensus that in order to arc saw, one requires no more than a suitable, normally round saw blade and a "suitable" electric power source which applies a potential between the object to be cut and the blade and which generates a "relatively high" current. U.S. Pat. Nos. 1,701,919; 2,015,415; 2,059,236; 2,355,838; and Re 20,035 are exemplary of the present state of the prior art as known to the inventors.

In all instances, the prior art patents are primarily concerned with the construction of the hardware for an arc saw, to wit the manner in which the saw is mounted, driven and advanced relative to the workpiece; the location of spindles, handles and switches; and the actual configuration of the saw blades, it having been thought that the blade should have conventional saw teeth or variously oriented, shaped and sized serrations to enhance the sawing process. The prior art is conspicuously silent as to the actual operation of the saw, the voltage and current requirements, the quality of the kerf that is cut into the workpiece and the like. These latter aspects, however, primarily determine whether or not a cut can be made at all and if so, whether or not it has the desired quality; and whether the saw, and especially the saw blade is capable of withstanding the intended use. In regard to these aspects the prior art provides no clue whatsoever. As a result, one intending to build an arc saw in accordance with the prior art is faced with developing his own power supply, being told no more than that it should yield a "relatively high current" though it is apparent on its face that a high current for one application may be an insufficient current for another operation.

The inventors of the present invention, during actual experimentations as well as during theoretical considerations of the needs of arc sawing quickly determined that arc saws constructed in accordance with the prior art simply were not operable. To be more precise, the prior art fails to teach or suggest how an arc can be efficiently and effectively built and operated. Problems encountered with arc saws constructed along the lines suggested in the prior art included an inability to sustain the cutting action of the saw; erratic and highly uneven and, therefore, low quality cuts; rapid wear and tear of the saw blades; unexpected and unexplainable current variations and surges during cutting; difficulties in controlling such cutting parameters as the cutting voltage, current and speed, the observation of a relative non-responsiveness of the cutting operation to changes in the applied voltage; and the like.

In addition to problems relating to the cutting per se, prior art saws were for most applications environmentally simply unacceptable. Unless the cutting is performed in a totally isolated atmosphere, the electric arcing that takes place during the arc sawing operation is so noisy that it is beyond human tolerance and would, for example, fail to meet present day industrial health and safety regulations. Additionally, prior art arc sawing methods develop great amounts of dust and flying debris, cause sight impairing electric sparks, and generate such a high degree of ultraviolet radiation as to require special shielding to prevent operating personnel from suffering skin burns.

It is, of course, not possible to speculate and isolate the one or more exact reasons which prevented arc sawing from becoming a comercially feasible cutting method. It is reasonable to assume, however, that the many drawbacks discussed above combined with the lack of control that could be exercised over the cutting operation and the generally low quality cuts that were made combined to spell the demise of arc sawing on a commercial scale.

SUMMARY OF THE INVENTION

The present invention resulted from the inventors' success in isolating important parameters that determine the performance of an arc saw and in applying these parameters to the operation and construction of the saw. As a result of the present invention, it is now possible to efficiently and economically make cuts through even the largest workpieces, such as steel ingots of sizes of up to 65 cm. in diameter and larger. The cuts are made at a very high speed and exhibit excellent surface finishes, of a quality competitive with other prior art cutting or sawing methods. All this is accomplished while the cutting operation is performed with virtually no atmospheric dust, debris or light contamination and at a sound level equal to that resulting from a relatively low volume rushing water flow.

A main aspect of the present invention relates to the actual operation of the saw. In order to perform any sawing or cutting at all it is necessary that a minimum or a threshold current is present, that current is virtually unaffected by the applied voltage and can be expressed in terms of the threshold current density $J_o$ where:

$$J_o = a \cdot 10^6 \text{ amperes per square meter (amps/m}^2\text{)}, \quad (1)$$

wherein

"a" is in the range of between about 2 and about 16.

For any given cut the threshold current density translates into a minimum or a threshold current $I_o$ wherein $$I_o = a \cdot s \cdot 10^6 \text{ amps, wherein} \quad (2)$$

$s = w \cdot l$ in m$^2$ and is the effective surface area of the kerf or cut;

$l =$ the arc segment length in m, that is the length of the blade periphery over which arcing occurs.

The formulas for $I_o$ and $J_o$ where empirically determined by the inventors on the basis of more than 600 test runs in which the current, voltage and the actual cutting, that is the actual melting of metal in the workpiece were carefully monitored. Up to the present, the inventors have been unable to fully isolate the parameters which determine the precise value of "a". It is believed, however, that "a" is relatively unaffected by the material being cut (the inventors' tests were performed on such diverse metals as carbon steel, stainless steel, cobalt-base high temperature alloys, nickel-base alloys, soft steel, tool steel, cast iron, aluminum, copper, zirconium and titanium) but it apparently is partially affected by the saw blade cross-section at its periphery, e.g., rectangular or triangular; the temperature of the environment in which the cut is made; and the actual temperature of the workpiece. The last parameter possibly has the greatest influence on the value of "a".

Although the stated range for "a" appears to cover all normally encountered circumstances, it is conceivable that the range may be exceeded under particular operating conditions. Moreover, on a statistical basis the inventors were able to determine that for operation of the saw at room temperature (environment as well as workpiece temperature) "a" has a value of approximately 5 for the cutting of steel, copper and aluminum. From this the inventors deduce that in the stated range for "a" of 2 to 16 most extreme operating conditions are probably included.

In actual operation, the application of the threshold current leads to a relatively low cutting speed. The inventors speculate that this is due to the fact that the major proportion of the energy transmitted to the workpiece by the threshold current is dissipated into the workpiece and results in a heating thereof. Consequently, a relatively low proportion of the energy is employed for the actual melting of workpiece metal. Therefore, in order to increase the cutting speed to the desired level, it is necessary to apply a cutting current I (in amps) which exceeds the threshold current $I_o$ by a factor of at least about 1.5 and preferably by a larger factor that normally falls into the range of between about 2 to about 40. Limits on the increase of the cutting current over the threshold current are the limits of the power supply and the maximum current the workpiece and/or the blade (hereinafter usually referred to as "workpiece") can conduct without an undue heat buildup.

Cutting currents in the range of from about 500 amps to about 15,000 amps have yielded excellent results when cutting workpieces made of steel, aluminum, copper, etc., and having thicknesses of from about 1 mm to about 200 mm. It is contemplated, however, to employ cutting currents of as much as 30,000 amps or more for cutting or slitting large cross-section workpieces such as 50–75 cm ingots and the like at very high cutting speeds.

Within the outlined cutting current consideration and limitations, it is, of course, desirable to employ the highest possible current so that a given cut can be completed in the shortest possible time. A subjective, on-the-spot determination of the maximum current is not feasible because even if one observes that the power supply has excess capacity, simply increasing the cutting speed to thereby correspondingly increase the cutting current will eventually outstrip the available current. At that point, the periphery of the blade will contact the kerf bottom and will short out the power supply, thereby requiring its immediate shutdown. Further, any physical contact between the blade and the workpiece damages both the workpiece and the saw blade and may require the replacement of either one or both of them, a result that should clearly be avoided under all circumstances.

In order to nevertheless maximize the cutting speed for a given workpiece and power supply, the present invention provides a method for determining the maximum possible cutting speed v where $$v = (J - J_o)/M \text{ in m/sec wherein} \quad (3)$$

$$j = (I/s) \text{ in amps;} \quad (4a)$$

$$M = (\Delta J/\Delta v) \text{ in amp-sec/m}^3 \quad (4b)$$

$J =$ cutting current density in amps/m$^2$
$I =$ the cutting current in amps
$\Delta v =$ the incremental change (in m/sec) in the speed v;
$\Delta J =$ the incremental change (in amps/m$^2$) in the current density which results from $\Delta v$; and
$s = w \cdot l$ as above defined.

$\Delta J/\Delta v$ is conveniently determined by measuring the cutting speed current density at different current speeds. It has been found that there is a substantially linear relationship between the two with the threshold current density being equal to a cutting speed approaching zero. $(\Delta J/\Delta v)$ then is the slope M of the resulting curve with M being further $$M = (\Delta H_m / E_{\it{eff}}) \text{ in (amps-sec/m}^3) \text{ wherein} \quad (5)$$

$\Delta H_m$ = enthalpy difference of the workpiece material between the actual workpiece temperature at which the workpiece material is removed (joules/meter$^3$), and $E_{\it{eff}}$ = an empirical effective voltage, most conviently referred to as the theoretical proportion of the applied voltage that goes into the melting of workpiece material as contrasted with the remaining proportion of the voltage that can be considered as going into heating of the workpiece material surrounding the cut and other losses. For most cutting conditions $E_{\it{eff}}$ is about 7 volts for cutting voltages in the range of between 15–45 volts.

Using the above formula (3) it is possible to calculate the cutting parameters required for a wide range of materials, sizes and conditions since the values of enthalpy of materials is available in tabulated form for most materials which would normally be cut. For example, by substituting (I/s) for J and for a given M one can readily determine the actual cutting speed $v = [(I/s) - J_o](1/M)$ for a predetermined cutting current I, a known $J_o$ and M, and the known effective kerf surface area s.

Thus, the present invention enables one to select the highest possible cutting speed for a given cutting current within the capacity of the power supply and/or the current take-up limitations of the workpiece. When the cutting speed is selected as above set forth, a high quality cut can be made in the shortest possible time.

The cost of power-supplies increases rapidly with their size. As an economic trade-off, its output might thus be insufficient to cut a large work piece in a single pass. That is, the power supply might not be able to produce the threshold current $I_o$ required. Moreover, when the power supply is able to produce only slightly more than the threshold current $I_o$, the cutting speed v can be exceedingly slow. In both these cases, the advantages of the present invention can nevertheless be attained by making the cut through the thick workpiece in multiple passes, each of which has a lesser depth than the total thickness of the workpiece. In the case where the power supply is unable to produce the threshold current $I_o$, this method is necessary to allow the workpiece to be cut. In the case where the power supply barely exceeds the threshold current $I_o$, this method reduces the overall time required to achieve the cut.

By incrementally cutting the workpiece, that is, by cutting the workpiece in multiple steps so that each cut has reduced depth, the threshhold current $I_o$ is reduced proportionally to the reduction in surface area of the kerf as indicated in equation (2), above. This reduction in threshold current $I_o$ may be necessary to perform a desired cut. But even when the cut can be achieved by the available power supply, cuts of a lesser depth can greatly increase the cutting speed v. Rearranging equation (3), the cutting speed v may be expressed:

$$v = [(I/s) - J_o](1/M) \quad (3a)$$

It can be seen that a decrease in the value of s causes an increased cutting speed v. Alternatively, by rearranging equation (3) in a slightly different manner, and substituting w.l for s, the maximum arc segment length can be determined from the desired cutting speed v:

$$l = I/w(J_o + Mv) \quad (3b)$$

From the arc segment length "$l$" and the known blade diameter the depth "$l_1$" of each individual cut is readily determined. In practice, it will be helpful to provide the operator of the saw with a table (not shown) which correlates specific cut depths "$l_1$" with arc segment lengths "$l$" *for one or more blade diameters.*

Since there exists a close relationship between the quality of the cut, the cutting speed and the cutting current, it is apparent that a change in either one may adversely affect the sawing operation. Accordingly, the present invention also provides that these parameters are continuously monitored and adjusted to keep them in balance. Normally, this means that the cutting speed is continuously varied so that the saw operates at a preselected, substantially constant cutting current, although operation of the saw at a preselected, constant cutting speed or voltage can be employed if it should prove advantageous for a particular application.

To control these cutting parameters the present invention contemplates to employ a well-regulated, rapidly responding power supply for the saw, which is preferably a constant voltage but which may be a constant current supply that provides the lowest feasible voltage commensurate with a high quality cutting action. The voltage selection is made so that there exists a relatively small arcing gap "g" between the periphery of the saw blade and the bottom of the kerf in order to assure a substantially homogeneous arcing over the arc segment length to assure a high quality cut having a good surface finish.

Since the arcing gap is almost solely a function of the applied voltage, while the rate of metal removal is almost solely a function of the current flow between the blade and the workpiece, the arcing gap must be sufficiently large to accommodate the constantly occurring changes in the metal removal rate and the corresponding changes in the saw blade feed or advancing speed without either increasing the arcing gap so much as to interrupt the current flow or causing electrical shorts from physical contact between the blade periphery and the kerf bottom.

In accordance with the present invention the arcing gap is preferably in the order of a few tenths of a mm, normally in the range of between about 0.2 to about 0.4 mm, with a resulting voltage between the blade and the workpiece in the range of between about 15 to 45 volts. A decrease in the voltage below 15 volts makes it most difficult to adequately control the blade advancing speed because the arcing gap becomes too small. An increase of the voltage above about 45 volts, though entirely operative, compromises the surface quality of the cut due to an increase of the arcing gap and a resulting non-uniform arcing over the arc segment length, which causes localized current surges and leads to the formation of cutting surface irregularities, gouges, streaking and the like.

The efficiency and effectiveness of the arc sawing method of the present invention is demonstrated by its high cutting rate. For example, while operating at a voltage of about 25 volts and with a cutting current of I = 13,000 amps cutting rates of approximately 1,800 cm$^2$/min. of workpiece cross-section have been attained while cutting ferrous materials, e.g., carbon steel, while cutting speeds of as high as about 5,000 cm$^2$/min. have been achieved when cutting aluminous materials (meaning metals comprising primarily aluminum). The inventors expect that these cutting rates can be increased by a factor of 2 or more with electric power sources of suitable sizes which, during the testing stage of the present invention, were not available to them and provided, of course, that the workpiece itself can handle such high current without overheating, localized melting or the like.

At least in part, this high cutting rate is made possible through the use of saw blades that are relatively thin, preferably in the range of between about 1.5 mm to about 6.5 mm. Such thin blades are feasible when the blade is as homogeneous as possible and free of peripheral teeth and/or serrations and further when the blade is rotated at a sufficiently high rate of rotation (in the vicinity of about 40 m/sec. of linear blade periphery speed) so that the blade periphery neither undulates nor overheats. In order to keep the blade truly planar during such high speed operation, it is preferably pre-tensioned by constructing the blade so that its center is dished-in while at rest. At increasing rotational speed, the periphery of the blade elongates more than the center so that the blade "straightens out" and assumes a flat, planar configuration devoid of peripheral undulations as are frequently experienced with blades that are flat when at rest.

In the past, blades, particularly abrasive blades, had to have a substantially greater thickness to enable sufficient strength and to enable accommodating peripheral teeth and/or serrations. This in turn increases the width of the kerf that is the cut, increases energy requirements and reduces the cutting speed, all of which renders the cutting operation more expensive.

At today's high metal prices, the reduced kerf width made possible by virtue of the present invention can result in significant material savings. For example, certain high grade metals, such a cobalt and nickel base alloys, presently sell for as much as $15.00 per kg. of more. When cutting a 61 cm (24 inch) diameter billet, for example, prior art sawing methods required a minimum kerf width of at least about 10 mm. In contrast thereto, such a billet can be arc sawed in accordance with the present invention with a 1 m diameter blade of a thickness of as little as about 2.5 mm (for underwater cutting) resulting in material savings of approximately 14 kg. per cut. This translates into monetary savings for a single such cut of around $250.00. Added thereto, must be cost reductions resulting from the high cutting speed and from the lesser energy consumption for such a thin cut because so much less metal must be removed, i.e., made molten during the cutting operation.

Although the arc saw of the present invention has significant advantages in the cutting of a variety of heavy metal sections, it also has some inherent advantages over abrasive saws and cold saws in the cutting of more delicate structures and of angle or mitre cuts in difficult-to-cut materials. Angle and mitre cuts at extreme angles are almost impossible to perform with hard materials and conventional sawing equipment. With the arc saw of the present invention such cuts are readily accomplished because no physical contact between blade and workpiece is required. Therefore, side pressure and snaking of the saw are not encountered.

For the same reason, it is possible to cut through a variety of cross-sections both thin or thick without crushing or tearing thin sections. Very thin metal structures can be accurately cut without damage due to the absence of heavy cutting pressures on the workpiece.

It has also been evidenced in the cutting apart of heat exchangers (such as found in nuclear power plants) and other difficult cross-sections that loose tubes and similar objects will not bind the saw because the arc melts away any binding action caused by a shifting of the workpiece or of components thereof. To date, the inventors have encountered several applications (such as bundles of very thin metal tubes) in cutting that can only be successfully accomplished with the arc saw of the invention.

In terms of the actual sawing apparatus, the present invention generally provides, in addition to the already discussed electrically conductive saw blades and the power source, means for rotating the blade about its axis power source, means for rotating the blade about its axis and feeding means for advancing the blade towards and past the workpiece while the power source causes a current flow between them. Means is further provided for monitoring the current flow between the blade and the workpiece. Control means is operatively coupled with the monitoring means and the feeding means for varying the blade advancing speed as a function of the monitored current flow so as to maintain the current flow substantially constant while the kerf is being cut.

The control means preferably includes means for setting a desired current flow magnitude for cutting the kerf in question which, broadly speaking, includes comparator means operatively coupled with the adjustment means and the monitoring means for generating a comparator signal responsive to the difference between the instantaneous current flow sensed by the monitoring means and the current flow magnitude set by the adjustment means. Means that is responsive to the comparator signal generates speed control signals which are applied to the feeding means to change the blade advancing speed until the set current flow magnitude substantially corresponds to the instantaneous current flow.

The saw blade is mounted to a support structure which preferably provides multi-directional saw blade movements, e.g., in mutually perpendicular X, Y and Z directions, so that vertical cuts for relatively small workpieces as well as cross-cuts and longitudinal or rip cuts can be made. To accommodate such multi-directional cutting, the saw blade is rotatable about a vertical axis through an arc of at least 90° by mounting the blade to one end of an elongate, tubular, vertically oriented piston that is reciprocably received in a tubular cylinder defining first and second pressure applying chambers. Indexing means if provided to operatively connect the cylinder and the piston for rotatably moving the piston between at least two operative saw blade positions, spaced-apart by an arc of 90° and for locking the piston in the respective operative saw positions. The indexing means is preferably constructed in the form of a knee-joint (sometimes also referred to as a "nutcracker" connection) which translates the rotational movements of the indexing means to the piston while permitting reciprocating piston movements.

In addition to accommodating the necessary pivotal saw blade movements, the provision of a hollow piston makes it possible to conveniently and efficiently guide hydraulic and electric power lines to the saw blade and to its associated drive motor.

It is apparent that the reciprocating, vertically oriented saw blade mounting piston provides the desired saw blade movement in the vertical or Z axis. To move the blade in the X and Y axes the cylinder is preferably mounted to and is linearly movable along a cross-head that spans over the workpiece being cut and that in turn is mounted to laterally spaced carriages movable along a rail that is perpendicular to the cross-head. Suitable drive means for moving the cylinder along the crosshead (in the X-direction) and the carriages in the Y-direction may include double acting hydraulic cylinders for relatively short travel lengths or rack and pinion drives for greater travel lengths. Since the latter drive always includes some play, which is intolerable in view of the small arcing gap employed during the sawing operation, a rack and pinion drive is preferably coupled with an an anti-backlash drive which counteracts the rack and pinion drive but which exerts a lesser force so that the latter overrides the former while all backlash or play is eliminated. Precise speed and position controls, which are necessary for accurately maintaining the cutting current flow, arcing gap and blade advancing speed relationships, are thereby possible.

When the arc saw is being operated to incrementally cut through a thick workpiece, it is preferable to counter-rotate the blade and cut only in one direction. During the return stroke, power to the blade is left on to facilitate removing any debris which may have accumulated in the kerf during the preceeding cut. This way, the next cut can be made along a clean, previously cut kerf. The vertical movement of the blade is accomplished by means of the blade mounting piston, and the cutting and return strokes of the blade are accomplished either by movement along the crosshead or movement of the crosshead along the rail, depending on whether the cut is accomplished along the X or Y axis. Alternatively, the return stroke of the blade can also be utilized as a cutting stroke by lowering the blade prior to the commencement of the return stroke. In such a case it is preferred to reverse the rotation of the blade during the return stroke so that it counter rotates with respect to the travel direction of the blade through the work piece.

BRIEF DESCRIPTION OF THE DRAWINGS

FIG. 4 is a schematic block diagram of the blade cutting speed-cutting current feedback control; and FIG. 5 is a diagram showing the relationship between cutting current density and cutting speed.

DESCRIPTION OF THE PREFERRED EMBODIMENTS

Figure 1:
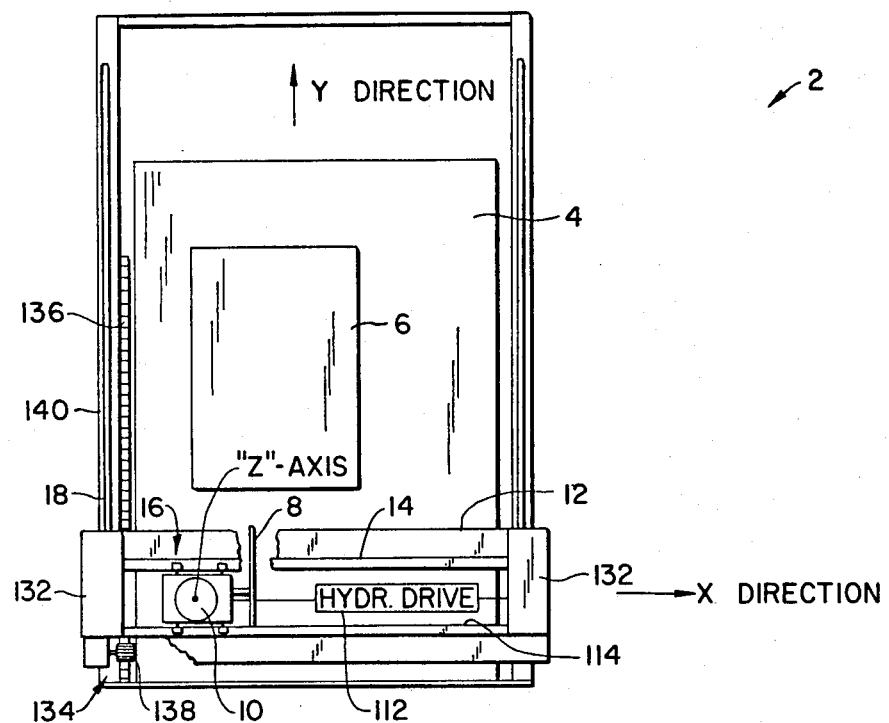
FIG. 1 is a plan view which schematically illustrates the overall construction of an electric arc saw constructed in accordance with the present invention.

Referring initially to FIG. 1, an arc saw 2 constructed in accordance with the present invention generally comprises a mounting table 5 for a workpiece 6 to be cut or slitted with a rotating saw blade 8 of the saw. The saw blade is mounted to a vertically reciprocating hydraulic actuator 10 (vertical actuator) for raising and lowering the blade in the Z-direction. The actuator also permits pivotal movements of the saw blade about the vertical Z axis from the position shown in FIG. 1 to one offset by 90° relative thereto.

The vertical actuator 10 is linearly reciprocably carried by a bridge or cross-head 12 which includes guide rails 14 and an X-direction drive 16 for reciprocating the vertical actuator in the X-direction. The bridge is disposed over mounting table 4, is carried by a pair of spaced-apart carriages 132, and is movable perpendicular to the guide rails 14 in the Y direction along a pair of tracks 18 which straddle the mounting table. In operation, an electric power source (not shown in FIG. 1) applies an electric potential or voltage between workpiece 6 and saw blade 8. The blade is rotated and advanced into the workpiece whereby an electric current flows between the two which melts a narrow kerf into the workpiece and thereby cuts or slits as is more fully described hereinafter.

Figure 2:
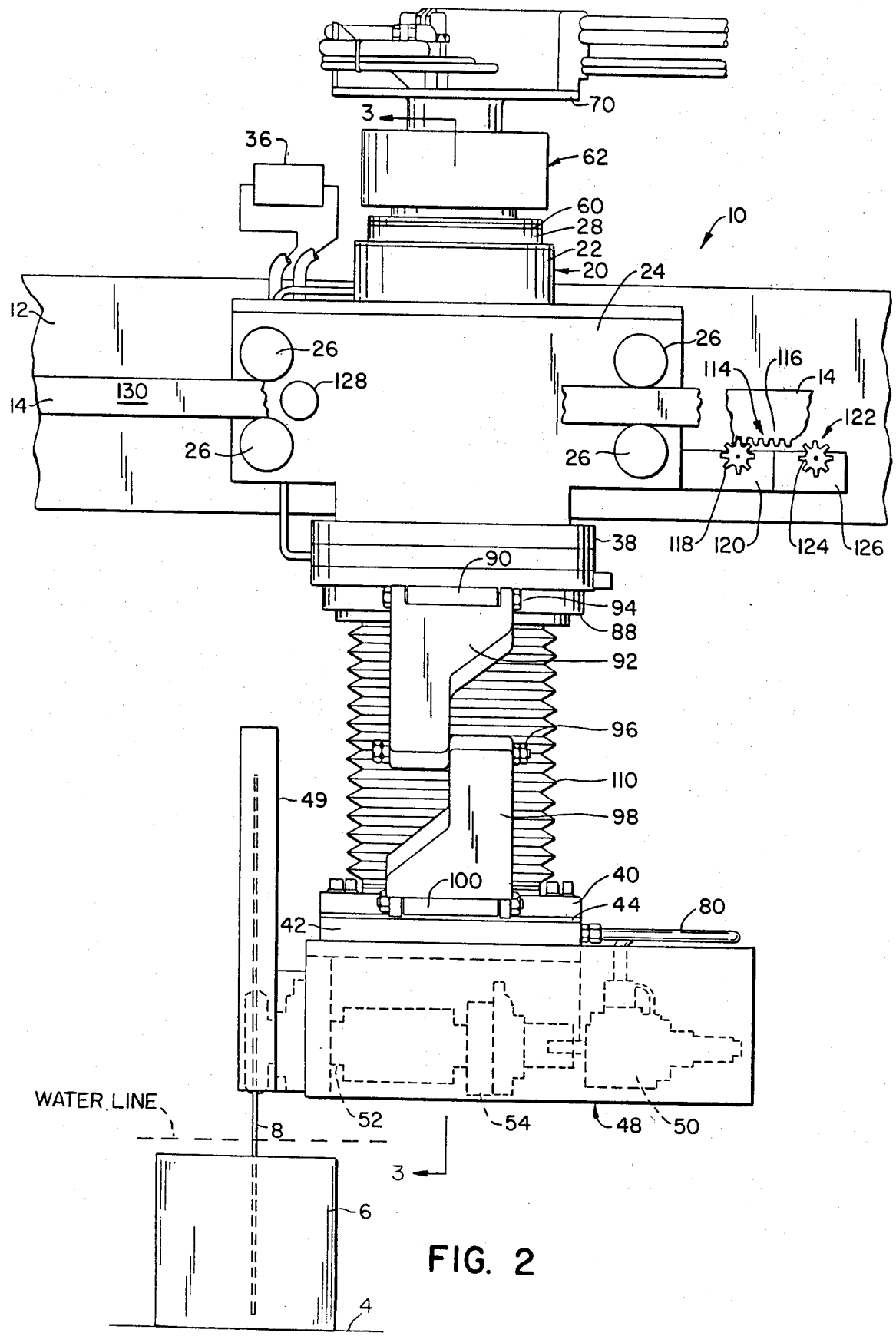
FIG. 2 is a fragmentary front elevational view of an electric arc saw mounting head constructed in accordance with the present invention and permitting pivotal blade movements about and reciprocating blade movements along a vertical axis.
Figure 3:
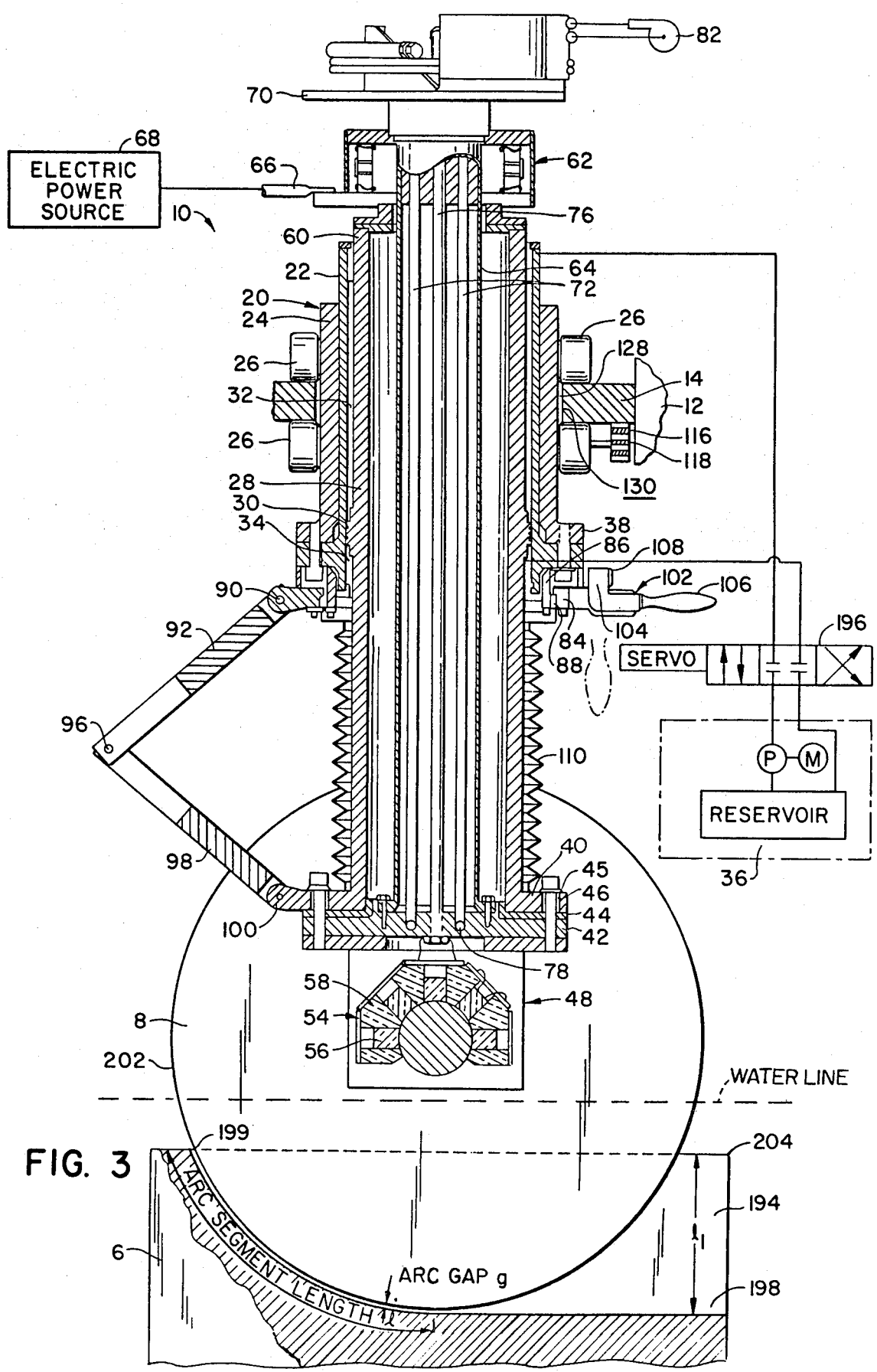
FIG. 3 is a fragmentary side elevational view in section and is taken along lines 3—3 of FIG. 2.

Referring now to FIGS. 1–3, the vertical actuator 10 that mounts the saw blade comprises a tubular, open-ended cylinder 20 defined by a cylinder sleeve 22 disposed between and surrounded by a tubular yoke 24 which carries two sets of rollers 26 that engage and support the yoke on guide rails 14 of bridge 12. An elongated, cylindrical and tubular piston 28 is reciprocably disposed within sleeve 22 and has a length at least about twice the length of the sleeve. At its axial center the piston 28 includes an annular projection 30 (FIG. 3) which is sealed to the interior cylindrical sleeve wall to define upper and lower pressure chambers 32 and 34. A source 36 of pressurized liquid is is operatively coupled with the prssure chambers via a suitable valve 196 and the upper and lower ends of the sleeve are sealed with respect to piston 28 so that the pressurization of the upper or lower chamber causes a corresponding movement of the piston in a downward or an upward direction, respectively. It should also be noted that the hydraulic piston is free to rotate about its vertical axis relative to sleeve 22, the later being fixed, e.g., bolted to an end flange 38 of yoke 24.

A lower end of piston 28 is defined by an end flange 40 to which is mounted a flange plate 42. The flange plate is insulated from the piston by insulation layers 44, washer 45 and insulating sleeve 46 (FIG. 3). A saw blade drive unit is attached to the underside of the flange plate and preferably includes a hydraulic motor 50 coupled with saw blade 8 via a horizontal shaft 52. A slip ring assembly 54 provides an electric connection capable of carrying the high cutting current between flange plate 42 and shaft 52. The slip ring assembly includes a plurality, e.g., four brushes 56 which are conventionally biased into engagement with the rotating shaft and which are carried in an otherwise conventional brush-holder 58 that is electrically coupled (not separately shown on the drawings) to the flange plate.

The upper end 60 of the piston carries an upper ring assembly 62 which electrically couples a tubular busbar 64 disposed interiorly of the hollow piston with a conductor 66 coupled to an electric power source 68. Carried on top of the tubular busbar is a connector plate 70 which couples the hydraulic lines, collectively identified with the reference numberal 72, with a like plurality of vertical hydraulic supply tubes 74 disposed interiorly of busbar 64 and piston 28. A tie-rod 76 secures the upper connector plate 70 to the upper piston end 60 and the lower piston flange plate 42.

The lower ends of the hydraulic supply tube 74 are fluidly connected through internal conduits 78 in flange plate 42 with a hydraulic motor feed line 80 and a return line (not shown in the drawings) so that pressurized hydraulic liquid from a hydraulic pump 82 can drive motor 50 to rotate blade 8.

A ring 84 is rotatably mounted with roller bearings 88 to a tubular cylinder stub 86 which projects downwardly from sleeve 22 and yoke 24. One side of the ring includes a radial projection 90 to which one end of an upper arm 92 is pivotally attached with a pivot bolt 94. The other end of the arm is pivotally connected with a pivot pin 96 to one end of a second, lower arm 98. The other end of the lower arm is, in turn, privotally connected to a boss 100 that projects radially outward of lower piston end flange 40.

An indexing and locking lever 102 is also mounted to ring 84, preferably opposite the radial ring projection 90. The lever has a generally L-shaped configuration and is positioned so that one of its legs 104 extends upwardly when handle 106 is in a horizontal position. Stop block sets 108 porject radially outward from cylinder stub 86 and they are dimensioned and located so that lever leg 104 can engage them and thereby lock the ring in desired operating orientations of the saw blade 8. For most purposes, the provision of two stop block sets 108, spaced apart 90° and located so that the saw blade can be aligned with the X and the Y axes, are sufficient.

The release of the locking lever by pivoting the handle in a clockwise direction (as seen in FIG. 3) enables the operator to rotate ring 84 with respect to sleeve 22 and yoke 24. This ring rotation is transmitted to piston 28 via pivot arm 92, 98 so that the proper and precise indexing of the ring results in a simultaneous proper and precise indexing of the piston and of saw blade 8. To prevent undesirable play or relative deflections, the pivot arms and their pivotal connections are relatively wide, as is best illustrated in FIG. 7, so that they are rigid in the direction of rotation of the ring to assure a precise duplication of the ring rotation by the blade. It will be observed that the knee-joint type connection provided by pivot arms 92, 98 accomondates reciprocating piston movements while providing the desired saw blade indexing and locking.

To protect the outer surface of piston 28 from contamination, which in time can compromise the seal between it and sleeve 22, a bellows sleeve 110 is provided. The ends of the bellows are attached to the lower piston end flange 40 and to the ring.

To operate the vertical actuator to raise or lower saw blade 8, pressurized hydraulic liquid from source 36 is introduced into the lower or the upper pressure chamber 34, 32, respectively, so that piston 28 moves in the vertical (Z) direction until it is at the desired elevation. In this connection, it should be noted that suitable valving such as a servo valve (collectively identified with reference numeral 196) pressure source 36 and the pressure chambers can be provided to effect a relatively rapid raising or lowering of the saw blade to put it into a desired position or, alternatively, to advance the blade in the Z direction at a precisely controlled rate to make a vertical cut through the workpiece 6.

In addition, the saw blade can be rotated about the Z axis between first and second operating positions in which the blade is parallel to the X axis or the Y axis, respectively, by disengaging locking lever 102 from one of the stop block sets 108 and rotating ring 84, arms 92 and 98, and therewith piston 28. When the blade is in the desired second operating position, locking lever 102 is pivoted in a counterclockwise direction (as seen in FIG. 3) to engage the other stop block sets 108. If desired for a particular application, additional stop block sets (not shown in the drawings) may, of course, be provided to index the blade in intermediate angular positions, such as at 30°, 45°, etc., relative to the above-mentioned first and second operating positions.

X direction movements of hydraulic actuator 10 and therewith of saw blade 8 are accomplished by moving rollers 26 attached to yoke 24 along guide rails 14 mounted to bridge 12. For short travel lengths, in the order of about 150 cm, a hydraulic drive 112 may be provided. Such a hydraulic drive has the advantage that it can be precisely controlled and that it is backlash-free. For a greater travel length, a rack and pinion drive 114 is preferred.

In one embodiment of the invention, a gear rack 116 is attached to the underside of guide rail 14 and is engaged by a spur gear 118 mounted to yoke 24 and driven by a motor 120. Since rack and pinion drives necessarily have some play, even if it is only in the order of a few tenths of a mm, and since for purposes of the present invention such a play is highly undesireable, if not unacceptable, because of the very small arc gap (also in the order of only a few tenths of an mm), the present invention provides an anti-backlash drive 122 which eliminates the play experienced with rack and pinion drive 114.

The anti-backlash drive is defened by a second spur gear 124 which is driven by an air or hydraulic motor 126 in a fixed direction. The drive force exerted by the anti-backlash motor is less than that exerted by the drive motor 120 so that the latter overrides the former. However, the force generated by anti-backlash motor 126 eliminates the earlier-discussed play inherent in rack and pinion drives and thus enables the prceise control of the position of the drive, and therewith of the vertical actuator 10 at all times. Accordingly, the provision of an anti-backlash drive 122 enables one to control and maintain the small arcing gap that exists between the blade periphery and the kerf bottom, as is more fully discussed below.

When guide rails 14 are flat, as illustrated in FIGS. 5 and 6, and rollers 26 are cylindrical, pressure pads 128 are provided which may comprise cylindrical discs that are spring or otherwised biased toward and into sliding engagement with faces 120 of the guide rails. In this manner, lateral movements (generally the Y-direction) of yoke 24 are prevented. Alternatively, the pressure pads can be replaced with suitably mounted idler wheels (not shown) or the yoke support rollers 26 can be peripherally grooved to engage guide rails which have corresponding wheel groove engaging and centering protrusions (not shown).

The ends of bridge 12 are supported by carriages 132 fitted with wheels (not separately shown) that support the bridge and vertical actuator 10 on and that ride in the Y direction along tracks 18. The tracks may be of any suitable construction, such as a triangular or circluar track engaged by correspondingly grooved wheels to guide the carriages in the Y-direction and to prevent lateral play thereof in the X-direction. The tracks are carried by suitable track supports 140 which straddle mounting table 4. The carriages are further fitted with a Y-direction rack and pinion drive 134 that includes a linear gear rack 136 and a cooperating spur gear 138 driven by a hydraulic or electrical motor (not separately shown). The Y-direction drive is also fitted with an anti-backlash drive (not separately shown) constructed, operating and coacting with the rack and pinion drive 134 in the same manner in which rack and pinion drive 114 coacts with anti-backlash drive 132 described above.

It will be apparent that the arc saw 2 enables the controlled movement of saw blade 8 in the X, Y and Z axes to make vertical and cross-cuts as well as longitudinal rip cuts (in the Y-direction). The saw further provides means for rotating and indexing the saw blade in first and second operating positions, spaced-apart by 90°, for aligning the blade with the X axis when cutting in the X-direction, with the Y axis when cutting in the Y-direction and with either the X or the Y axis when making vertical cuts.

The mounting table 4 underlies bridge 12 and receives and supports workpiece 6 while it is being cut. Typically, it includes provisions (not shown) for submerging the whole workpiece, or at least those portions of the workpiece in which a kerf is being cut, under water. The typical water level is illustrated in both FIGS. 2 and 3.

Referring now to FIGS. 1-4, the operation of arc saw 2 will be discussed in greater detail. Initially workpiece 6 is mounted on table 4 and saw blade 8 is moved to the desired location at which the cut is to commence. As an example, it is assumed that a rip cut (in the Y-direction) is to be made and that a kerf 194 is to be cut or slitted into the workpiece which does not extend entirely through the workpiece, as is illustrated in FIGS. 2 and 3. The saw blade is oriented so that its drive shaft 52 is parallel to the X-direction and the blade itself faces in the Y-direction as is shown in FIG. 3. If necessary, the saw blade is rotated about the Z axis by releasing locking lever 102 and rotating saw blade mounting piston 28 into the desired saw blade position. The lever is then engaged with stop block sets 108 to properly index, i.e., to properly align the blade with the Y-direction.

Valve 196 (FIG. 3) is suitable operated to raise or lower, as the case may be, piston 28 and therewith saw blade 8 until the lowermost point of the saw blade substantially coincides with the desired location of kerf bottom 198.

Next the operator selects the desired cutting current based on the capacity of electric power source 68 and the ability of workpiece 6 to withstand such current without undue heating, melting or the like. Assuming that there are no restrictions in the current capacity of the workpiece (at least within the maximum current output of electric power source 68) and assuming that the cut does not require a lower current due to special surface finish requirements for the cut, the operator will normally set the cutting current at or at a point approaching the maximum current rating of the power source to minimize cutting time.

Having selected the cutting current, the operator next proceeds with setting the cutting speed v in accordance with the above-mentioned equation (5), or $$v = (J - J_o) \cdot (\Delta v / \Delta J) \text{ m/sec, which can be further transformed into} \quad (6)$$

$$v = [(I/s - J_o)] (\Delta v / \Delta J) \text{ m/sec} \quad (7)$$

in which I is again the cutting current and s the effective kerf surface area

Referring now momentarily to FIG. 5, $(\Delta J / \Delta v)$ is preferably tabulated or in graphic form, as is illustrated in FIG. 5, by plotting the cutting current density for a given material from measured values for cutting current I, the kerf depth "$l_1$" and the kerf width "$w$". Typically, the speed and cutting current density relationship is linear as is illustrated in FIG. 5 with the minimum cutting current density $J_o$ being the earlier-discussed threshold current density at which the cutting speed approaches zero. For practical purposes, of course, at $J_o$ the cutting speed is not zero but very slow. $\Delta v$ and $\Delta J$ are defined by the slope of curve 200 and can be directly read off a diagram. M values can be established for various materials tabulated to assist the operator in setting parameters.

The drive unit for advancing the blade in the cutting direction, in the present example the Y-direction, rack and pinion drive 134, includes suitable speed controls, such as valves (not separately shown) in the event the drive motor is a hydraulic motor, or electric controls in the event the drive motor is an electric motor, to precisely set the rate at which the drive advances carriages 132, bridge 12 and therewith blade 8 in the cutting (Y) direction.

Having selected the proper drive speed for the cut to be performed, electric power source 68 and blade drive motor 50 are energized, and Y-direction drive 134 is activated to advance the blade towards the workpiece 6 mounted on table 4 and submerged in water. As soon as blade periphery 202 comes in close proximity to the workpiece, arcing between the blade periphery and the workpiece commences, thereby melting workpiece material which is removed instantaneously by the rotating blade and the water stream induced thereby. Since intially there is a very high current concentration between the blade periphery and workpiece edge 204, the workpiece material melts rapidly so that no physical contact between the blade and the workpiece occurs. As the blade continues its advance in the Y-direction into the workpiece, the effective depth of the kerf 194 increases until it reaches the value "$l_1$". At this point, the cutting current I flows between the blade and the workpiece, provided the blade advancing speed v is selected as above-described. To facilitate the removal of resolidified molten metal particles from the kerf, particularly in instances in which the kerf is relatively long (as when making rip cuts) the blade 8 can be counter rotated to its travel direction through the workpiece so that it exits kerf 194 at the point 199 where the kerf is being cut, as is illustrated in FIG. 3. Arcing occurs substantially homogenously and uniformly over the "arc segment lengths"$l$, that is the section of blade periphery 202 which is directly opposite and parallel to kerf bottom 198. There is, moreover, an arcing gap "$g$" between the blade periphery and the kerf bottom.

In cases where the capacity of the power supply is insufficient to yield the threshhold current $I_o$ for the desired depth of cut through the desired material, or where the capacity is so low that the cutting speed v would be very slow, the operator follows an alternate method of operation. By reducing the depth of the cut, the operator can reduce the necessary threshhold current $I_o$ until it is within the capacity of the power supply. Moreover, by further reducing the depth of cut, the operator can increase the cutting speed v to greatly reduce the overall cutting time required for the particular cut.

When such multiple cuts are made in a kerf of increasing depth, it is presently preferred to clear the kerf of metallic debris from the previous cut prior to beginning the next cutting stroke. For this reason, it is preferred to operate the cutting stroke in one direction only while returning the blade through the kerf to clear the kerf of debris. During the return stroke, power to the blade is maintained and the blade is rotated to help in clearing the kerf. Since the depth of the blade has not been changed, however, no additional cut is accomplished.

Alternatively, each stroke of the saw blade through the workpiece can be a power stroke. In such an event, the saw blade travels well beyond the end of the workpiece and is there lowered by the desired depth of the next incremental cut. The blade is then returned to its original position with the power supply enegized to thereby cut deeper into the work piece. This process is repeated until the desired kerf has been cut. To facilitate the removal of debris from the kerf, the rotation of the blade is preferably reversed for each stroke so that the blade counter rotates to its travel direction through the work piece.

As above-mentioned, the arcing gap is a function of the applied voltage and for a given cutting current, this gap should remain constant. For a variety of reasons, however, the cutting current fluctuates when v is constant because of variations in the cross-section of the workpiece, discontinuities, such as voids in the workpiece, differences in the workpiece density, the presence of foreign particles in the workpiece material or in the arcing gap, etc. This leads to current variations and can at times cause physical contact between the rotating saw blade periphery and the kerf bottom which can seriously damage either or both, and a shorting of the power source which requires its shut down as well as the shut down of the whole sawing operation.

To prevent such damage and shut downs, the present invention provides a feedback control 206 (see FIG. 4) which includes a current (or voltage) transducer 208 of power supply 68 is a constant voltage (or constant current) supply which continuously monitors the cutting current I (or voltage) and which applies a cutting current (or voltage) magnitude signal to a comparator 210. The second input to the comparator is a current (or voltage) reference signal from a current (or voltage) selector 212. Any difference between the current sensed by transducer 208 and the current selected by selecto 212 generates a corresponding difference or error signal that is applied to an arc control error amplifier 216. The error amplifier includes electrical compensation which modifies the error signal to avoid the occurrence of self-induced (and self-defeating) current oscillations. The compensated error signal from the error amplifier 216 is applied via a control logic 218 (further discussed below) to a power amplifier 220 which controls the drive mechanism that advances the blade 8 in the cutting direction. In the above stated example in which the cutting direction is the Y-direction, the blade drive is the Y-direction rack and pinion drive 134.

The just-described feedback control 206 thus operates to constantly regulate and, as necessary, change the cutting spped v of blade 8 so as to maintain cutting current I at the selected level, that is substantially constant. In other words, the feedback control 206 is a cutting speed regulator which operates automatically, taking into account the above-discussed current versus cutting speed relationship.

To render the feedback control applicable to all three potential cutting drives, that is to vertical actuator 10 (Z-direction), hydraulic drive 112 or rack and pinion drive 114 (X-direction), as well as the Y-direction drive 134, control logic 218 is interposed between the comparator and the blade drive so as to apply the compensated error signal to the proper power amplifier and drive mechanism. In this manner, a signal feedback control can be employed for advancing the blade in either the X, Y or the Z direction.

Referring still specifically to FIG. 4, for optimum control and operator information, the present invention includes a velocity transducer 222 which senses the cutting speed of blade 8 and a position transducer 228 which senses the instantaneous blade position. In the preferred embodiment, a digital X, Y and Z position display is provided, which accurately advises the operator of the instantaneous blade position in all three directions.

The output of the position transducer 228 is applied to a comparator 223, which also receives the output from a position selector 224. The error or difference signal generated by comparator 223 is applied to error amplifier 225 and can be used in a position control mode via control logic 218, power amplifier 220 and the Y-direction blade drive 134 to advance the blade and maintain the velocity set by velocity selector 226.

From the preceding description, it will be apparent that although the advantages of the present invention can be attained from manually setting the blade cutting speed v in accordance with equation (6), current variations due to factors beyond the operator's control occur constantly. To avoid a shorting of power source 68 or a loss of arcing, a sufficiently high voltage would have to be chosen to create an arcing gap "g" which is sufficiently large so that neither occurs. Such a high voltage, normally well above 40–50 volts, however, leads to cuts having a poor quality. The provision of the above-discussed feedback control 206 eliminates this problem.

Although the best mode contemplated for carrying out the present invention has been herein shown and described, it will be appreciated that variations and modifications may be made without departing from what is regarded to be the subject matter of the present invention.

What is claimed is:

1. A method for cutting a kerf in a metal object with an electric arc saw, the saw including a saw blade and a means for adjusting the depth of cut of the sawblade in the metal object, the method comprising:

flowing a preselected cutting current between the object and the blade;

determining the maximum depth at which the blade is able to cut a kerf with the preselected cutting current;

advancing the sawblade in a first direction relative to the metal object so that the sawblade produces a cut having a depth which is less or equal to the maximum depth;

returning the sawblade through cut formed during the advancing step.

2. A method according to claim 1 including the step of rotating the saw blade in a direction counter to the direction of travel during the advancing step.

3. A method according to claim 1 wherein the advancing step comprises the step of advancing the saw blade a plurality of times through the metal object, and moving the saw blade further toward the object prior to the commencement of the next advancing step to thereby incrementally increase the depth of the cut.

4. A method according to claim 3 including the step of moving the saw blade after each advancing step to thereby incrementally increase the depth of the cut during the returning step.

5. A method according to claim 4 including the step of reversing the rotation of the saw blade after each advancing and returning step.

6. A method for cutting a kerf in a metal object with an electric arc saw including a saw blade and a means for adjusting the cutting depth of the blade in the metal object, said method comprising:

advancing the saw blade in a first direction into close proximity with the object;

passing a cutting current I between the saw blade and the object which equals at least:

$a \cdot s \cdot 10^6$ amps wherein a is in the range of between about 2 and about 16;

s is the effective surface area of the cut (arc segment length × kerf width) in $m^2$;

so that cutting of the object through melting of the metal commences substantially instantaneously upon the commencement of current flow between the member and the object;

returning the saw blade opposite to the first direction through the kerf so that debris formed during the cutting stroke is removed therefrom;

moving the blade to increase its cutting depth after completion of the returning step; and repeating the adjusting, returning and moving steps until the kerf extends to the desired depth in the object.

7. A method according to claim 6 wherein the repeating step is performed until the kerf extends entirely through the object.

8. A method for cutting a kerf of a desired depth into a metal object with a relatively thin disc, the method comprising:

(a) applying a voltage differential to the object and the disc;

(b) rotating the disc;

(c) advancing the disc from a starting position through the object and at a preselected depth so that the disc forms a cut having an arc segment 1 which is less than $(I/w (j_o + Mv))$ where:

I = electric cutting current flowing between the disc and the object;

$J_o = a \cdot 10^6$ amps/$m^2$;

a = a number in the range of 2 to 16;

w = width of the kerf in m;

v = desired cutting speed (m/sec.);

$M = (\Delta J/\Delta v)$; and

J = incremental increase in the current density corresponding to an incremental increase v in the travel speed of the blade through the object;

(d) returning the disc to the starting position; and (e) repeating steps (c) and (d) until the kerf is the desired depth.

9. A method as in claim 8, further comprising repeating steps (c) through (d) until the metal object has been cut into two pieces.

10. A method according to claim 8 including the step of moving the blade to the preselected depth.

11. A method according to claim 10 wherein the moving step is performed prior to the advancing and returning steps so that the disc forges a cut during the advancing and returning steps.

12. A method according to claim 8 wherein the moving step is performed prior to the advancing step and wherein the returning step includes the step of maintaining the blade at the previously set preselected depth so that debris in the previously formed cut is removed therefrom by the blade.

13. A method according to claim 12 wherein the applying step continues during the returning step to facilitate the removal of debris from the cut.

14. A method for arc sawing a kerf in a metal object comprising:

providing a relatively thin, circular disc;

positioning the object at a cutting location;

applying a preselected voltage across the object and the disc;

moving the disc into a sufficiently close proximity with the object to initiate an electric current flow between the disc and the object;

determining an optimum depth and cutting speed at which the disc can melt a cut in the object at the preselected voltage;

advancing the disc in a first direction relative to the object and adjusting the relative depth and cutting speed of the disc to the optimum values so that the current melts a cut of a predetermined depth in the object;

returning the disc through the cut in the opposite direction at substantially the same depth relative to the object; and repeating both the advancing and returning steps at increasingly greater relative depths until the kerf has been completed.

* * * * *